(12) United States Patent
Kim

(10) Patent No.: US 8,376,200 B2
(45) Date of Patent: Feb. 19, 2013

(54) TRASH COLLECTOR FOR VEHICLES

(75) Inventor: Bum Kee Kim, Corona, CA (US)

(73) Assignee: Sinclair Worldwide, Ontario, CA (US)

( * ) Notice: Subject to any disclaimer, the term of this patent is extended or adjusted under 35 U.S.C. 154(b) by 654 days.

(21) Appl. No.: 12/646,034

(22) Filed: Dec. 23, 2009

(65) Prior Publication Data
US 2010/0155445 A1 Jun. 24, 2010

(30) Foreign Application Priority Data

Dec. 24, 2008 (KR) .................... 20-2008-0017087 U

(51) Int. Cl.
*B60R 11/00* (2006.01)
(52) U.S. Cl. ......... 224/563; 224/275; 224/547; 224/928
(58) Field of Classification Search .................. 224/563, 224/275, 547–549, 555, 560, 566, 567, 572, 224/928; 119/161; 383/33, 34, 34.1, 43, 383/906; 248/99, 100, 101
See application file for complete search history.

(56) References Cited

U.S. PATENT DOCUMENTS

| | | | | | |
|---|---|---|---|---|---|
| 2,142,904 | A | * | 1/1939 | Lamarthe | 24/30.5 R |
| 2,241,612 | A | * | 5/1941 | Norris | 55/369 |
| 2,778,554 | A | * | 1/1957 | Porkola | 224/553 |
| 2,789,781 | A | * | 4/1957 | Miller | 248/100 |
| 3,888,406 | A | * | 6/1975 | Nippes | 206/554 |
| 4,069,994 | A | * | 1/1978 | Wharmby | 248/101 |
| 4,235,350 | A | * | 11/1980 | Valentino | 220/495.1 |
| 4,537,377 | A | * | 8/1985 | Shewchuk | 248/99 |
| 4,763,808 | A | * | 8/1988 | Guhl et al. | 220/495.1 |
| 4,946,065 | A | * | 8/1990 | Goulter et al. | 220/495.1 |
| 5,226,576 | A | * | 7/1993 | Ellsworth | 224/572 |
| 5,314,151 | A | * | 5/1994 | Carter-Mann | 248/100 |
| 5,362,153 | A | * | 11/1994 | Lu | 383/38 |
| 5,887,748 | A | * | 3/1999 | Nguyen | 220/495.08 |
| 6,971,697 | B2 | * | 12/2005 | Morales | 296/37.1 |
| 2008/0128460 | A1 | * | 6/2008 | Adler et al. | 224/275 |
| 2010/0282755 | A1 | * | 11/2010 | Kim | 220/495.07 |

* cited by examiner

*Primary Examiner* — Nathan J Newhouse
*Assistant Examiner* — Corey Skurdal
(74) *Attorney, Agent, or Firm* — Berenato & White, LLC

(57) ABSTRACT

A trash collector for vehicles in which trash produced in the vehicles are collected and processed neatly and efficiently. The trash collector includes: a body having a space for containing trash and an opening portion; a fixing clip which is detachably installed on an inner side surface of the body; and a roll of vinyl bags which are hung on the hanging portions of the fixing clip and are successively supplied downwards in the body. Here, shield wings are formed on the inner side surface of the body and are inserted into the roll of vinyl bags to thus prevent trash from being exposed. A plurality of leaf springs extend along the opening portion, to enable the space of the body to be maintained at an opened state and with an elastic force, if flexural strengths of the leaf springs exceed threshold points of the leaf springs.

9 Claims, 6 Drawing Sheets

TRASH COLLECTOR FOR VEHICLES

CROSS-REFERENCE TO RELATED APPLICATION AND CLAIM TO PRIORITY

This application claims the benefit of Korean Utility Model Application No. 20-2008-0017087, filed on Dec. 24, 2008, in the Korean Intellectual Property Office, the disclosure of which is incorporated herein by reference.

FIELD OF THE INVENTION

The present invention relates to a trash collector for vehicles, and more particularly, to a trash collector for vehicles in which trashes that are produced in the vehicles are collected and processed neatly and efficiently.

BACKGROUND OF THE INVENTION

Usually, various kinds of convenient facilities are installed in vehicles for the sake of drivers. Accordingly, those various kinds of convenient facilities are configured so that drivers who run vehicles can use them safely and conveniently, at the state where the drivers do not lose their front sight.

When only a driver runs alone or together with a passenger fellow on a passenger seat or back seat, various kinds of trash such as snipes or half-smoked cigarettes, cookies, paper bags, drink containers, fruit skins, etc., are deposited in vehicle. However, no particular articles for collecting the various kinds of trash such as snipes or half-smoked cigarettes, cookies, paper bags, drink containers, fruit skins, etc., have been yet installed in vehicles.

Of course, trash boxes are installed at the side of a driver seat or a back seat, in order to collect trash such as snipes or half-smoked cigarettes, but such trash boxes are limited to collecting trash of large volume.

Accordingly, trash that is produced in the inside of vehicles is taken to destination points at a state where the trash remain derelict. Otherwise, trash that is produced in the inside of vehicles are contained in vinyl paper bags which pack various kinds of foodstuffs or supplies at purchase and then remain derelict in the vehicles, so as to be dumped at destination points.

However, the above-described trash collection methods have caused the following problems.

Since trash that has been produced in the vehicles remain derelict as they are in the vehicles, there may cause to spoil a fine view of the vehicles, and make passengers of vehicles feel unpleasant feeling from the discarded trash.

In addition, seats of the vehicles may be polluted from the residual foods, and offensive odors may occur from the contaminated seats, which do not offer passengers agreeable environments.

That is, basic aims that vehicles should be maintained in comfortable and agreeable circumstances during running of the vehicles have not been satisfied.

Furthermore, some inconsiderate people throw away trash without permission at roadsides or on roads, in order to avoid bad views or offensive odors from happening in the vehicles, which makes other people frown their brows.

SUMMARY OF THE INVENTION

To overcome problems or inconveniences of the conventional art, it is an object of the present invention to provide a trash collector for vehicles which enables people to conveniently collect trash that is produced in the vehicles and to process the collected trash neatly and efficiently.

To accomplish the above object of the present invention, according to an aspect of the present invention, there is provided a trash collector for vehicles comprising: a body having a space for containing trashes therein and an opening portion which opens and closes the space at the top thereof; a fixing clip which is detachably installed on an inner side surface of the body and has hanging portions which are bent from the inner side surface of the body toward the upper portion of the body; and a roll of vinyl bags which are hung on the hanging portions of the fixing clip and are successively supplied downwards in the body, wherein shield wings are formed on the inner side surface of the body and are inserted into the roll of vinyl bags to thus prevent trashes from being exposed, and a plurality of leaf springs are formed along the girth of the opening portion, to enable the space of the body to be maintained at an opened state and with an elastic force, if flexural strengths of the leaf springs exceed threshold points of the leaf springs.

Preferably but not necessarily, an opening and closing portion which can open and close the space at the side of the body is formed in the opening portion of the body.

Preferably but not necessarily, the opening and closing portion is a zipper portion.

Preferably but not necessarily, a plurality of hanging rings are further formed on the body.

Preferably but not necessarily, at least one auxiliary coupling portion which is detachably coupled with the hanging ring is provided in the body, wherein the auxiliary coupling portion comprises: a detachable portion having a hanging groove whose side surface is opened; an extended portion which is extended from the detachable portion and formed so as to be freely folded; and a bent portion which is bent in a multiple step from the end of the extended portion toward the upper portion of the extended portion, so that the hanging ring is hung on the bent portion.

Preferably but not necessarily, press buttons are installed on the fixing clip and the inner side surface of the body, respectively, so as to be combined mutually.

Preferably but not necessarily, the fixing clip is formed in an integral form.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
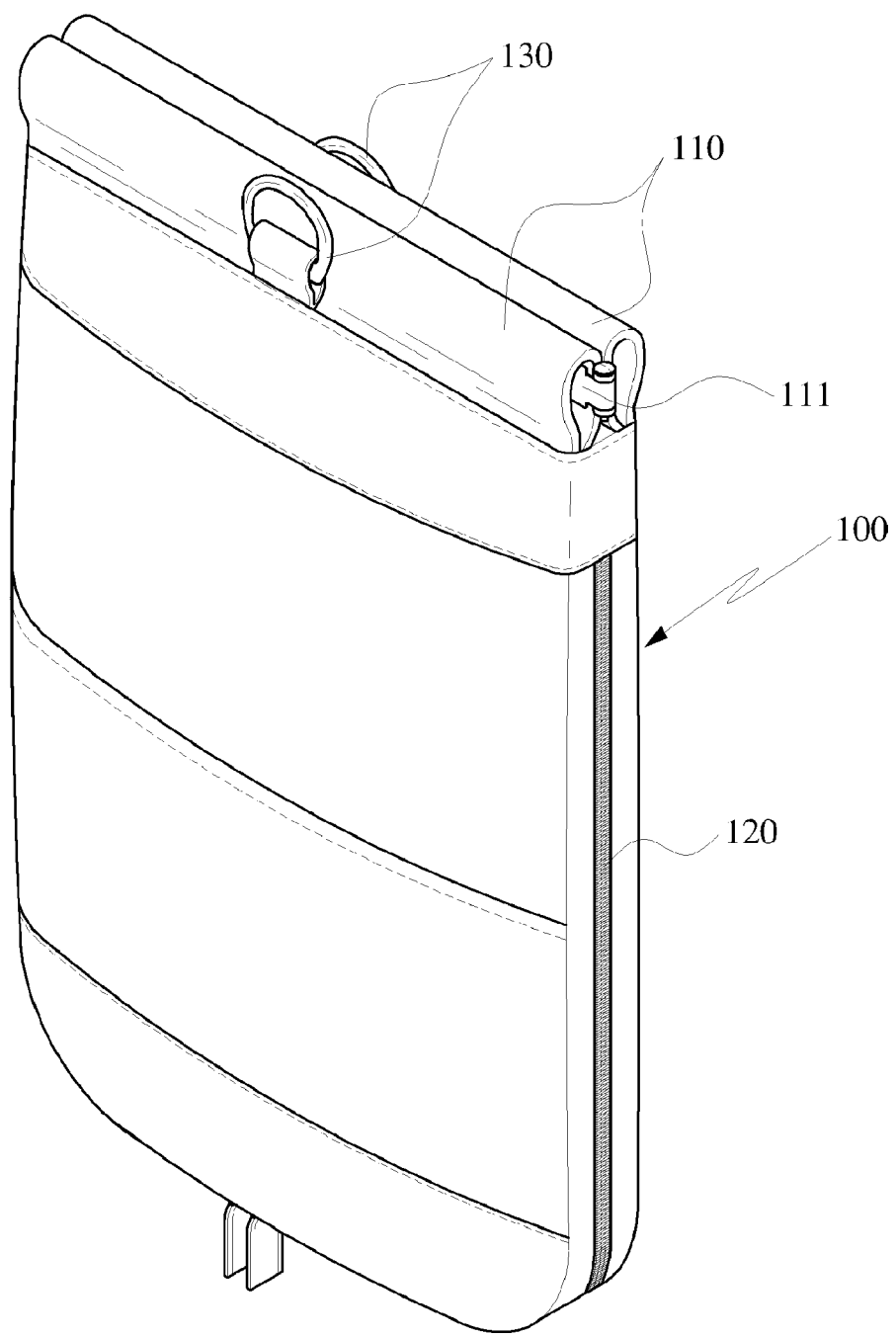
FIG. 1 is a perspective view showing a trash collector for vehicles according to a preferred embodiment of the present invention.

Hereinbelow, a trash collector for vehicles (hereinafter referred to as a trash collector) according to an embodiment of the present invention will be described with reference to the accompanying drawings, that is, FIGS. 1 through 6. Like reference numerals are assigned for like elements in the drawings.

The trash collector is configured to include a body 100, a fixing clip 200, a roll of vinyl bags 300, and an auxiliary coupling portion 400.

The body 100 provides a space to contain trash. The fixing clip 200 and a roll of vinyl bags 300 are installed in the body 100.

The body 100 is preferably made of leather or cloth of a soft quality of a material so as to be conveniently used.

In addition, an opening portion 110 that can open and close the space of the body 100 is formed on the upper part of the body 100.

Here, the opening portion 110 is formed of a pair of opening portions that are closely attached to each other.

Accordingly, users can widen the opening portion 110 in order to open the space of body 100.

Meanwhile, a plurality of leaf springs 111 are installed in the inside of the opening portion 110.

Accordingly, in the case that the opening portion 110 is widened, the leaf springs 111 are bent. If the flexural strengths of the leaf springs 111 exceeds threshold points of the leaf springs 111, the leaf springs 111 are maintained in a bent state in view of their property.

That is, since the opening portion 110 is not naturally restored, the space or interior of the body 100 can be kept at an opened state.

Meanwhile, an opening and closing portion 120 that can open and close the space of the body 100 at the side of the body 100 is formed on the girth formed along the side surface of the body 100.

The opening and closing portion 120 enables users to open the space of the body 100 laterally and conveniently take out a sheet of a roll of vinyl bags 300 which contains trashes.

Here, the opening and closing portion 120 is preferably a zipper portion.

Here, a plurality of hanging rings 130 are installed on the outer side surface of the body 100.

The hanging rings 130 are hanging portions which enable users to hang the body 100 on structures in vehicles. Positions or structures in vehicles where the hanging rings 130 may be installed are not limited to any particular location although they likely will be in the interior of the vehicle.

In addition, shield wings 140 made of leather or cloth are preferably further formed on the inner side surface of the body 100.

The shield wings 140 shield the inner portion of the roll of vinyl bags 300, to thus avoid the trash from being exposed and prevent an offensive odor from leaking to the outside of the body 100.

Here, a pair of the shield wings 140 are provided on the inner side surface of the body 100, and are installed on the opposing surfaces of the inner side surface of the body 100, respectively.

Here, one end of the respective shield wings 140 is fixed on the upper portion of the inner side surface of the body 100, by backstitch etc., and the other end of the respective shield wings 140 is arranged at a state of being inserted into the inside of the roll of the vinyl bags 300.

Next, the fixing clip 200 is provided for fixing the roll of the vinyl bags 300.

Here, the fixing clip 200 is detachably installed on the inner side surface of the body 100.

The fixing clip 200 is preferably made of plastic, and is preferably integrally formed in one body.

Here, the fixing clip 200 includes a detachable portion 210 which is detachably installed on the inner side surface of the body 100, a hanging portion 220 which is bent in a multiple step upwards from the detachable portion 210, and a connection portion 230 which is integrally connected with the hanging portion 220.

The detachable portion 210 is a portion that is attached to or detached from the body 100, in which detachable members are formed on the detachable portion 210 and the body 100, respectively.

Here, press buttons 201 are preferably used as the detachable members.

That is, press buttons 201 are formed on the outer side surface of the fixing clip 200 and the inner side surface of the body 100, respectively. Accordingly, the press buttons 201 formed on the outer side surface of the fixing clip 200 can be simply attached to or detached from the inner side surface of the body 100.

In addition, since the hanging portion 220 is of a configuration that is bent upwards from the detachable portion 210, a predetermined gap is formed between the detachable portion 210 and the hanging portion 220.

Accordingly, an overlapping portion of a roll of vinyl bags 300 is loaded and arranged in the predetermined gap.

In addition, the connection portion 230 plays a role of making the fixing clip 200 integrally formed in one body, and is formed so as to be flexibly folded depending upon flexural strength of the opening portion 110 at the time of opening and closing the opening portion 110.

Figure 2:
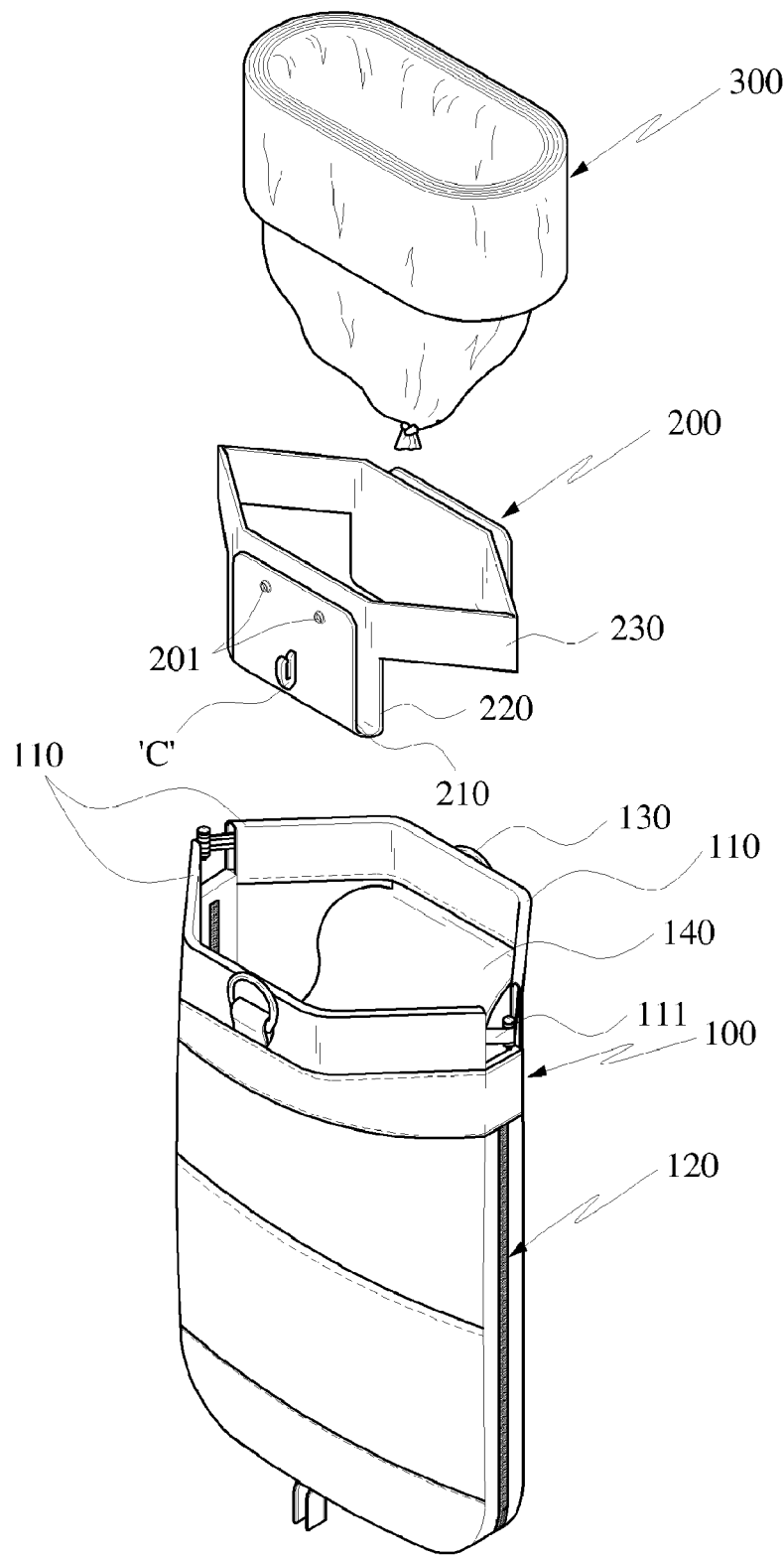
FIG. 2 is an exploded perspective view showing a trash collector for vehicles according to a preferred embodiment of the present invention.
Figure 3:
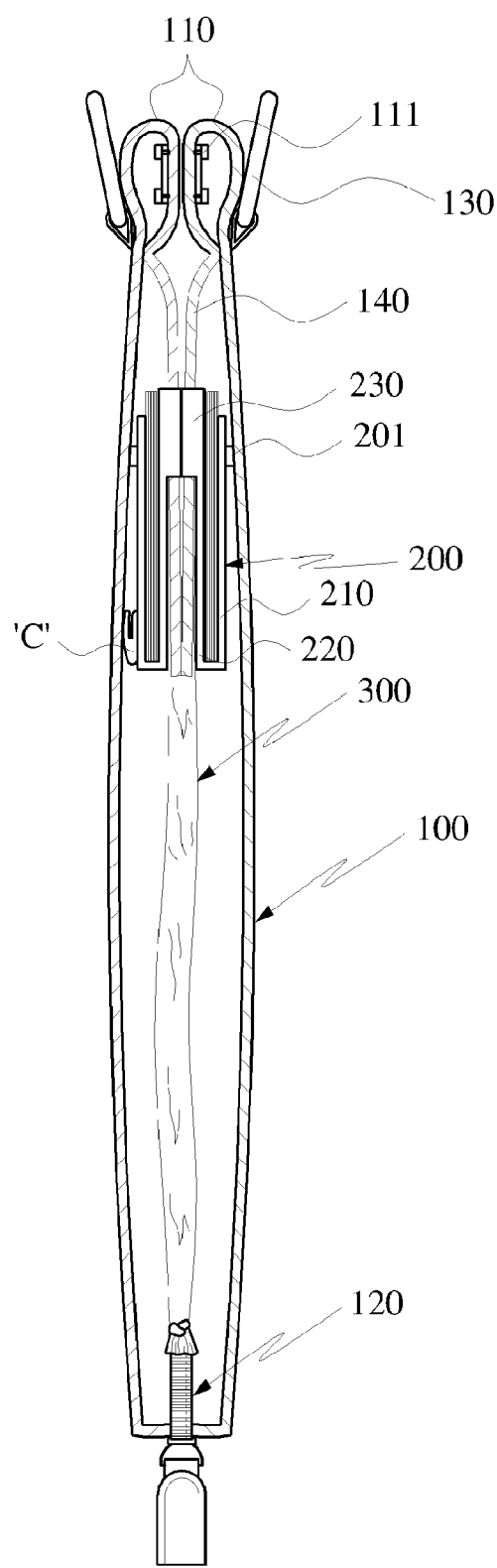
FIG. 3 is a cross-sectional view showing a trash collector for vehicles according to a preferred embodiment of the present invention.
Figure 4:
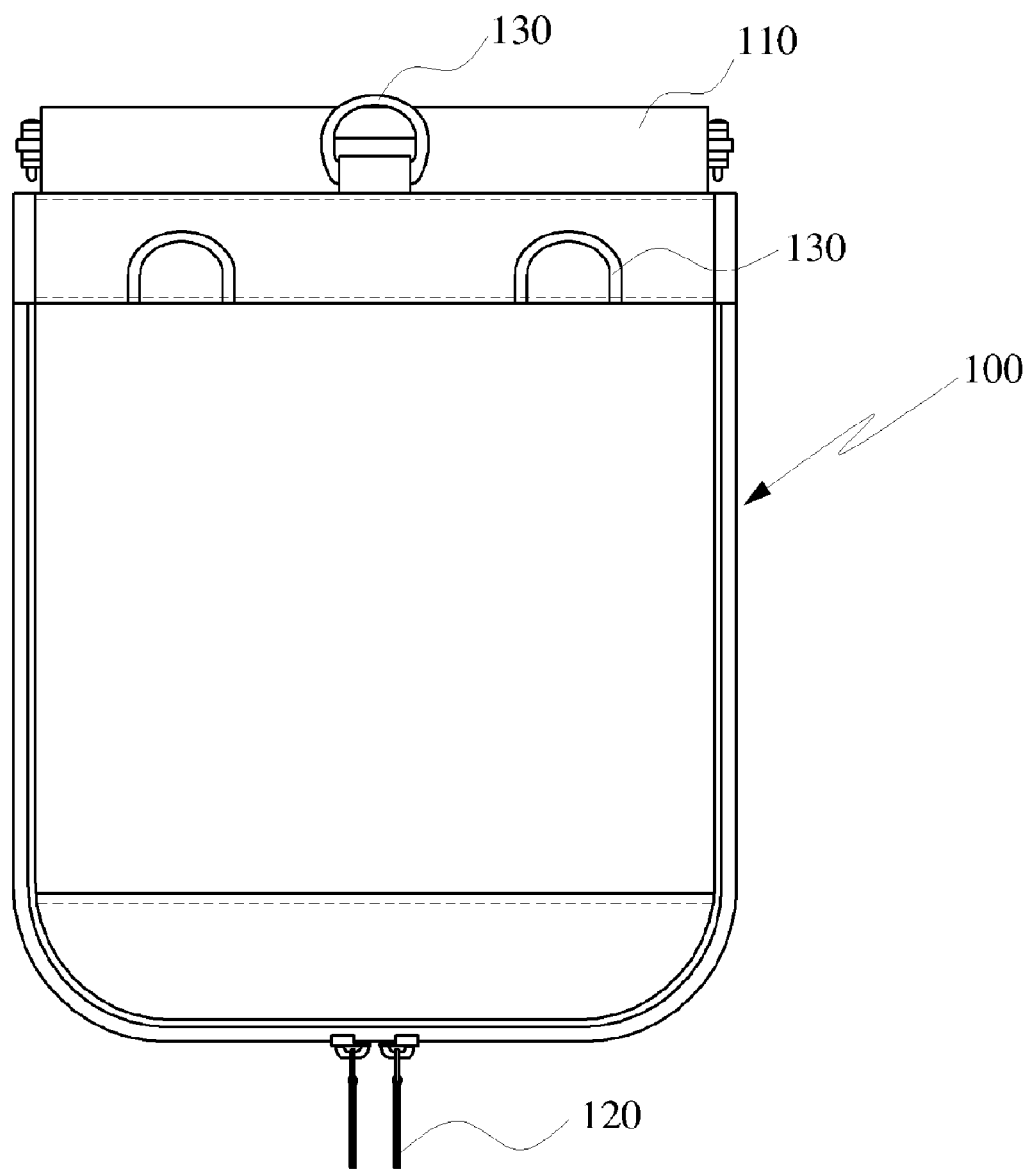
FIG. 4 is a rear view showing a trash collector for vehicles according to a preferred embodiment of the present invention.

That is, as illustrated in FIG. 2, the connection portion 230 connects with the top portion of the hanging portion 220, and is formed so that thickness of edges of the connection portion 230 is formed to be thin. Thus, the connection portion 230 can be smoothly folded.

Meanwhile, a cutter C is installed on the fixing clip 200.

The cutter C is to cut a part of the roll of the vinyl bags 300, and is preferably installed at one side of the detachable portion 210 of the fixing clip 200.

Next, the roll of vinyl bags 300 contains trash and is combined with the fixing clip 200.

The roll of vinyl bags 300 is formed of a roll of vinyl sheets both ends of which are opened and lengths of which are long in which the vinyl sheets are rolled in an overlapping form.

Here, the rolled overlapping portion is arranged in a space formed between the hanging portion 220 and the detachable portion 210 of the fixing clip 200.

Accordingly, one end of the roll of vinyl bags 300 is opened to accommodate trash, and the other end of the roll of vinyl bags 300 is arranged in a space of the body 100 through the fixing clip 200.

Here, the other end of the roll of vinyl bags 300 is tied so that trash may not fall out.

Next, the auxiliary coupling portion 400 plays a role of hanging the body 100 on a structure of the vehicle, and is made of a separate member.

Of course, although a plurality of hanging rings 130 are provided in the body 100, the trash collector for vehicles according to the present invention may not be hung on various positions in the vehicles only with the hanging rings 130.

Figure 5:
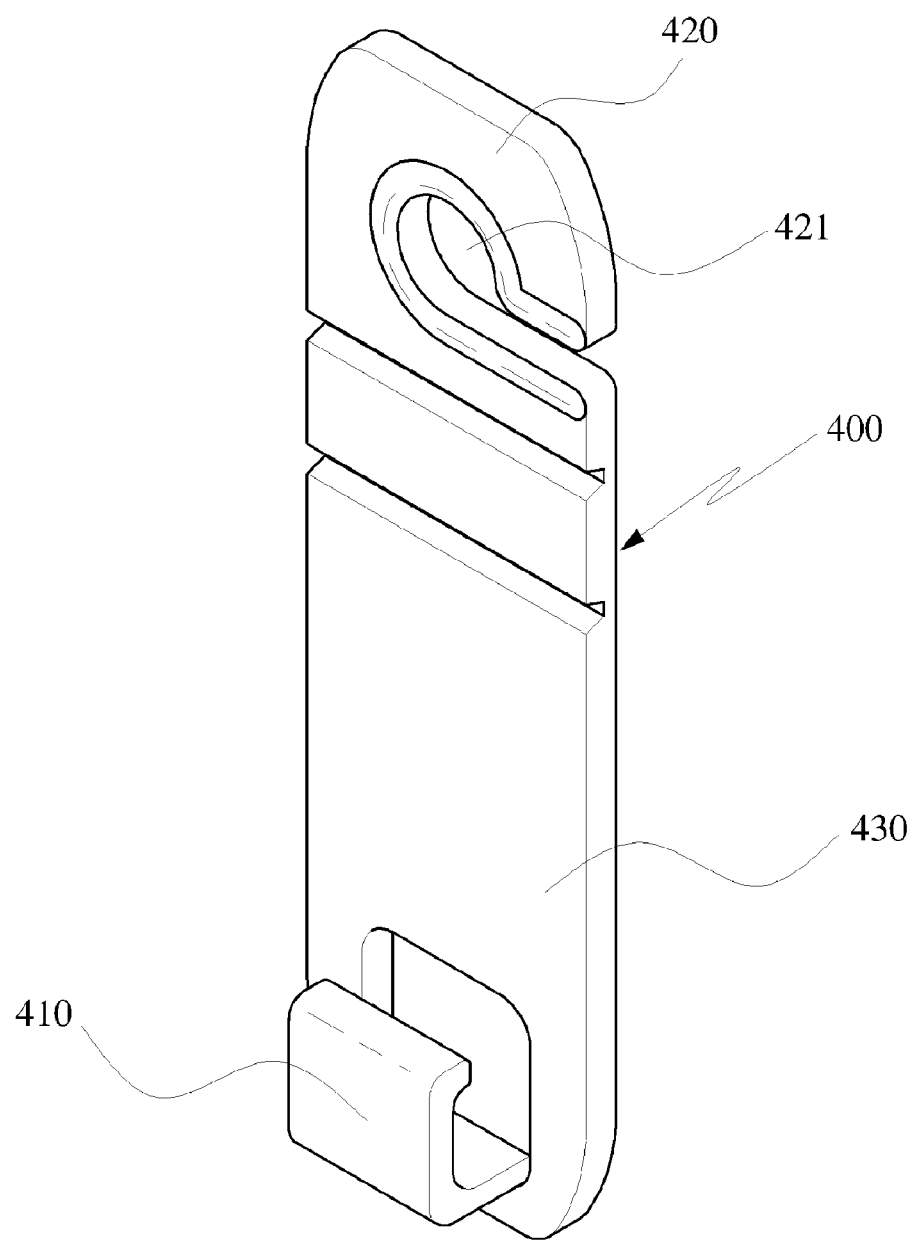
FIG. 5 is a perspective view showing an auxiliary coupling portion which is detachably coupled with a trash collector for vehicles according to a preferred embodiment of the present invention.

As illustrated in FIG. 5, the auxiliary coupling portion 400 includes a detachable portion 420 having a hanging groove 421 whose side surface is opened, an extended portion 430 which is extended from the detachable portion 420 and formed so as to be freely folded, and a bent portion 410 which is bent in a multiple step from the end of the extended portion 430 toward the upper portion of the extended portion 430, so that the hanging ring 130 is hung on the bent portion 410.

Here, the auxiliary coupling portion 400 is preferably made of a synthetic resin material, and preferably a soft material whose flexure is free.

Hereinbelow, coupling and function of the trash collector having the above-described structure will be described.

The fixing clip 200 is combined on the inner side surface of the body 100.

Here, the fixing clip 200 is combined with the inner side surface of the body 100 each other by the press buttons 201 which are formed on the fixing clip 200.

Then, a roll of vinyl bags 300 is hung on and combined with the hanging portion 220 of the fixing clip 200.

Here, one end of the roll of vinyl bags 300 is opened, and the other end of the roll of vinyl bags 300 is arranged at the lower side of the space of the body 100 through the fixing clip 200.

Then, a pair of shield wings 140 provided on the inner side surface of the body 100 are inserted into the inside of the roll of vinyl bags 300.

Accordingly, the inner side of the roll of vinyl bags 300 is shielded by the shield wings 140.

Here, the term "shield" does not mean that trash may not be contained in the roll of vinyl bags 300. If the opening 110 of the body 100 is widened, that is, opened, the shield wings 140 and the connection portion 230 of the fixing clip 200 are also widened together with the opening 110 of the body 100. Accordingly, the inner portion of the roll of vinyl bags 300 is opened so as to contain trash.

Figure 6:
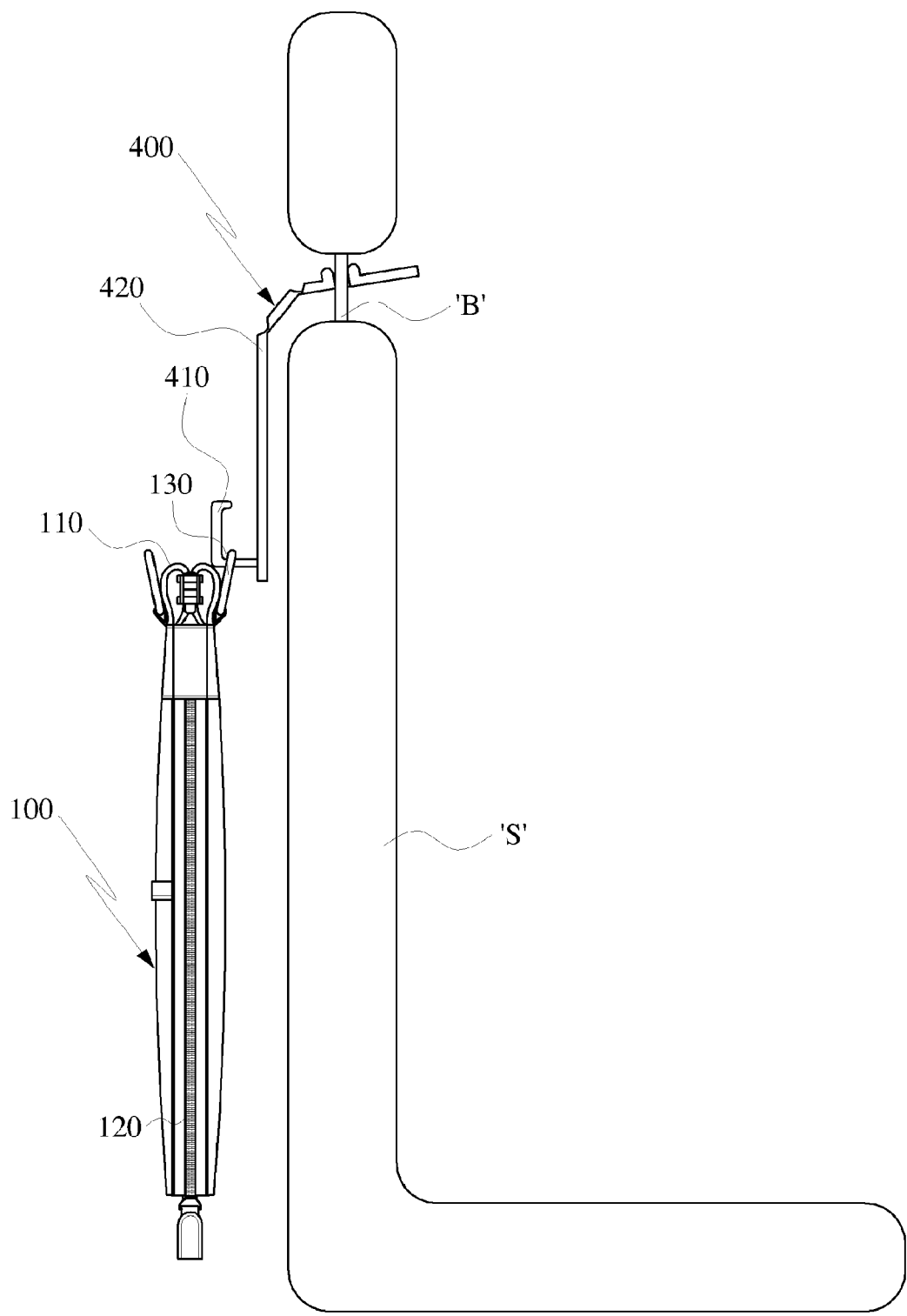
FIG. 6 is a side view showing a trash collector for vehicles according to a preferred embodiment of the present invention is installed on a seat in a vehicle.

Next, the auxiliary coupling portion 400 is hung on one of the hanging rings 130 of the trash collector for vehicles and then hung on and combined with an internal structure in a vehicle, for example, a neck support 'B' of a driver seat 'S', as illustrated in FIG. 6.

Here, the bent portion 410 of the auxiliary coupling portion 400 is hung on and combined with the hanging ring 130 of the body 100, and the hanging groove 421 is hung on and combined with the neck support 'B'.

In this manner, the trash collector for vehicles according to the present invention is completely coupled and installed in the vehicle.

In order to contain trash in the trash collector which has been completely coupled and installed in the vehicle, the opening 110 is widened at first and then the space of body 100 is opened.

In this case, the leaf springs 111 provided in the opening 110 pass over a critical point, that is, a threshold point, to thus maintain a state where the opening 110 has been bent, and to thereby maintain to open the space of the body 100.

Then, trash is deposited into the roll of vinyl bags 300 through the opening 110.

Here, the trash has been contained in the roll of vinyl bags 300 through the shield wings 140, and hidden by the shield wings 140.

Accordingly, the trash is not exposed nor does an offensive odor leak from the trash collector for vehicles, that is, the roll of vinyl bags 300.

Therefore, passengers do not feel unpleasant feelings due to the trash during the time when the vehicle runs to a destination place.

Meanwhile, when the passengers arrive at a resting place or destination place, they should do the following operations to remove the trash-contained roll of vinyl bags 300.

Open the zipper which is the opening and closing portion 120 and thus open the space of the body 100.

Then, although it is not illustrated in the drawings, cut a portion of the roll of vinyl bags 300, using a cutter installed in the inside of the body 100.

Then, bind the cut portion of the roll of vinyl bags 300, in order to close both sides of the roll of vinyl bags 300, to then be thrown away into a waste bin.

Close or lock the zipper 120 and close the opened space of the body 100.

Accordingly, a processing for trash that is neatly and cleanly ended.

The trash collector for vehicles according to this invention has the following effects.

Firstly, a plurality of leaf springs are installed on the opening of the body, and thus opening of the body can be kept continuously by the elastic force of the leaf springs. Accordingly, trash can be conveniently thrown into the body of the trash collector for vehicles.

Secondly, collection and treatment of trash can be conveniently performed with a roll of vinyl bags in which a vinyl bag is consecutively supplied from the roll of vinyl bags. Accordingly, since trash can be treated as necessary, the internal hygiene of the vehicle remains clean.

Thirdly, shield wings are formed on the inside of the body, in order to shield the inner portion of the roll of the vinyl bags. Accordingly, an offensive odor due to the trash is reduced, and the trash is prevented from being exposed, to thus heighten user satisfaction. Furthermore, passengers as well as drivers can travel to the destination place in an agreeable environment.

Finally, a plurality of hanging rings are installed on the body, and an auxiliary coupling portion is provided on the hanging rings, respectively. Accordingly, the trash collector for vehicles according to the present invention can be simply hung on an internal structure of a vehicle.

The present invention is not limited to the above-described embodiments. It is apparent to one who has an ordinary skill in the art that there may be many modifications and variations within the same technical spirit of the invention.

What is claimed is:

1. A trash collector for vehicles comprising:
    a body having a space for containing trash therein and an opening portion which opens and closes the space at the top thereof;
    a fixing clip which is detachably installed on an inner side surface of the body and has hanging portions which are bent from the inner side surface of the body toward the upper portion of the body; and
    a roll of vinyl bags which are hung on the hanging portions of the fixing clip and are successively supplied downwards into the body,
    wherein shield wings are formed on the inner side surface of the body and are inserted into the roll of vinyl bags to thus prevent trash from being exposed, and
    wherein a plurality of leaf springs are formed along the girth of the opening portion, to enable the space of the body to be maintained at an opened state and with an elastic force, if flexural strengths of the leaf springs exceed threshold points of the leaf springs.

2. The trash collector for vehicles according to claim 1, wherein press buttons are installed on the fixing clip and the inner side surface of the body, respectively, so as to be combined mutually.

3. The trash collector for vehicles according to claim 1, wherein the fixing clip is formed in an integral form.

4. The trash collector for vehicles according to claim 1, wherein an opening and closing portion which can open and close the space at the side of the body is formed in the opening portion of the body.

5. The trash collector for vehicles according to claim 4, wherein the opening and closing portion is a zipper portion.

6. The trash collector for vehicles according to claim 4, wherein press buttons are installed on the fixing clip and the inner side surface of the body, respectively, so as to be combined mutually.

7. The trash collector for vehicles according to claim 4, wherein the fixing clip is formed in an integral form.

8. The trash collector for vehicles according to claim 1, wherein a plurality of hanging rings are further formed on the body.

9. The trash collector for vehicles according to claim 8, wherein at least one auxiliary coupling portion which is detachably coupled with the hanging ring is provided in the body, and
wherein the auxiliary coupling portion comprises: a detachable portion having a hanging groove whose side surface is opened; an extended portion which is extended from the detachable portion and formed so as to be freely folded; and a bent portion which is bent in a multiple step from the end of the extended portion toward the upper portion of the extended portion, so that the hanging ring is hung on the bent portion.

* * * * *